(12) United States Patent
Buentello et al.

(10) Patent No.: US 7,941,330 B1
(45) Date of Patent: May 10, 2011

(54) SYSTEMS AND METHODS FOR HOME INVENTORY AND INSURANCE

(75) Inventors: Andre Rene Buentello, San Antonio, TX (US); Bradly Jay Billman, San Antonio, TX (US); Gail Ann Bennett, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 12/487,866

(22) Filed: Jun. 19, 2009

(51) Int. Cl.
*G06Q 40/00* (2006.01)
(52) U.S. Cl. .......................................................... 705/4
(58) Field of Classification Search ................... 705/28, 705/4, 38; 709/206; 235/380
See application file for complete search history.

(56) References Cited

U.S. PATENT DOCUMENTS

| | | | |
|---|---|---|---|
| 6,533,168 B1 * | 3/2003 | Ching | 235/375 |
| 6,678,685 B2 * | 1/2004 | McGill et al. | 725/34 |
| 6,829,584 B2 * | 12/2004 | Loveland | 705/7 |
| 7,299,970 B1 * | 11/2007 | Ching | 235/375 |
| 7,343,310 B1 * | 3/2008 | Stender | 705/4 |
| 7,551,849 B1 * | 6/2009 | Abad | 396/310 |
| 7,630,910 B2 * | 12/2009 | Bonissone et al. | 705/4 |
| 7,664,667 B1 * | 2/2010 | Ruppelt et al. | 705/8 |
| 2002/0143564 A1 * | 10/2002 | Webb et al. | 705/1 |
| 2003/0023493 A1 * | 1/2003 | Ohashi et al. | 705/16 |
| 2004/0153352 A1 * | 8/2004 | Berns et al. | 705/8 |
| 2005/0060236 A1 | 3/2005 | Iulo | |
| 2005/0197907 A1 | 9/2005 | Weiss | |
| 2005/0273440 A1 * | 12/2005 | Ching | 705/64 |
| 2006/0161462 A1 * | 7/2006 | Sharma | 705/4 |
| 2006/0178902 A1 * | 8/2006 | Vicars et al. | 705/1 |
| 2006/0282342 A1 * | 12/2006 | Chapman | 705/28 |
| 2007/0033108 A1 * | 2/2007 | Luhr | 705/22 |
| 2007/0136109 A1 * | 6/2007 | Yager et al. | 705/4 |
| 2008/0033847 A1 * | 2/2008 | McIntosh | 705/28 |
| 2009/0024420 A1 * | 1/2009 | Winkler | 705/4 |
| 2009/0043629 A1 * | 2/2009 | Price | 705/8 |
| 2009/0138560 A1 * | 5/2009 | Stahl | 709/206 |

FOREIGN PATENT DOCUMENTS

WO WO 9526536 A1 * 10/1995

OTHER PUBLICATIONS

"The Benefits", OiiNOW, Online Insurance Inventory, 2005-2008, 2 pages.
Fallon, Liz: "How to Conduct a Home Inventory for Your Homeowner's Insurance Policy", Ezine @rticles, 5 pages.
"How Do I Make an Inventory List for My Homeowners Insurance?", Allstate, 1 page.

* cited by examiner

*Primary Examiner* — Ella Colbert
*Assistant Examiner* — Chika Ojiaku
(74) *Attorney, Agent, or Firm* — Kilpatrick Townsend & Stockton LLP

(57) ABSTRACT

Information may be received regarding items purchased or otherwise acquired by a user, and the items may be added to an electronic home inventory maintained by an institution system and the items may be added to an insurance policy issued by the institution system. The institution system may receive information about an item from the merchant who sold the item, an appraiser, the user, from a barcode that is provided on the receipt associated with the purchase, by a barcode generated by the user (e.g., using data from the receipt and other information from the user), and/or via data from a financial card transaction directed to the purchase. The user may be provided with a listing of the items, and can select which items are to be included in the home inventory and which items are to be added to an insurance policy.

21 Claims, 7 Drawing Sheets

SYSTEMS AND METHODS FOR HOME INVENTORY AND INSURANCE

BACKGROUND

Insurance is a form of risk management primarily used to hedge against the risk of a contingent loss, and may be defined as the equitable transfer of the risk of a loss, from one entity to another, in exchange for a premium. An insurer is a company that sells insurance. An insurance rate is a factor used to determine the amount, called the premium, to be charged for a certain amount of insurance coverage. Adding personal property items to an insurance policy is a manual and time consuming process and is often neglected by the owner of the items.

A home inventory of personal property items is useful in conjunction with insuring those items. A user may have a handwritten inventory, but this may be destroyed in a loss that also destroys the items. The user may store the inventory in a difficult to access location, such as a safe deposit box, which makes updating the inventory burdensome. Maintaining a home inventory is a time consuming process and therefore many people do not maintain a home inventory or keep a home inventory up to date. This may leave some of their personal property items unprotected by insurance.

SUMMARY

Information may be received regarding one or more items purchased or otherwise acquired by a user, and the item(s) may be added to an electronic home inventory maintained in storage by an institution system and the item(s) may be added to an insurance policy issued by the institution system.

In an implementation, the institution system may receive information about the item(s) from the merchant who sold the item(s), an appraiser, the user (e.g., who provides information by a website, by providing a receipt, etc.), from a barcode that is provided on the receipt associated with the purchase from the merchant, by a barcode generated by the user (e.g., using data from the receipt and other information from the user), and/or via data from a financial card transaction directed to the purchase of the item(s).

In an implementation, the user may be provided with a listing of the items that they have purchased or otherwise acquired using the data provided to the institution system, and can select which items are to be included in the home inventory and which items are to be added to an insurance policy.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
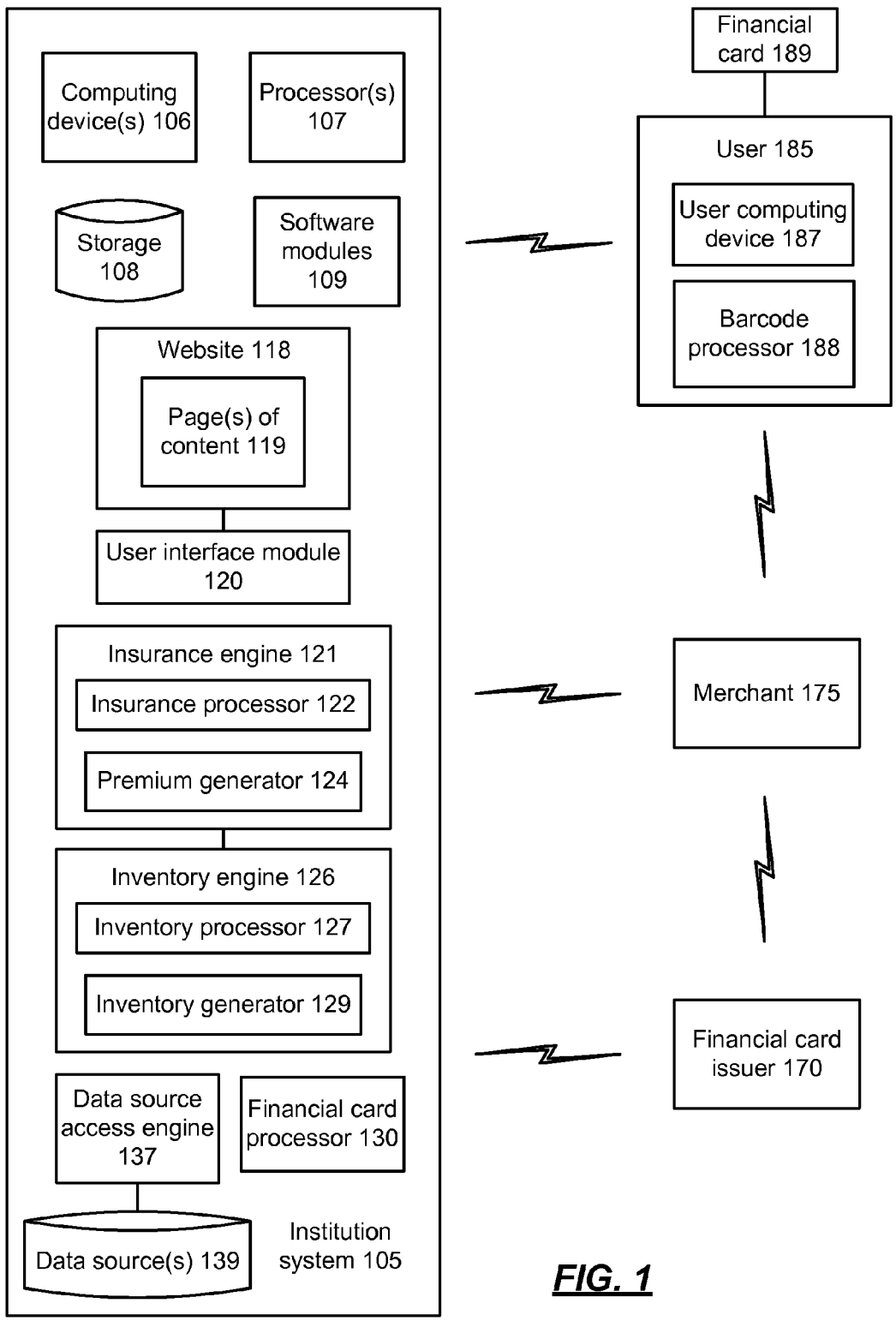
FIG. 1 is a block diagram of an implementation of a system that may be used to provide home inventory and insurance.

FIG. 1 is a block diagram of an implementation of a system that may be used to provide home inventory and insurance. An institution system 105 may be associated with an institution which may be any type of entity capable of providing an insurance policy and maintaining in storage a home inventory of items. For example, the institution may be any type of insurance company, financial services company, etc.

A user 185 and an associated user computing device 187 are shown, along with a merchant 175 and a financial card issuer 170. The user 185 may make a purchase from the merchant 175 using a financial card 189 and insure item(s) associated with the purchase with the institution system 105. The institution system 105 may also generate an inventory of the items purchased as a home inventory and store the home inventory in storage, such as storage 108 or one or more data sources 139. In an implementation, the home inventory of the user 185 may be associated in storage (e.g., in a database) of the institution system 105 with the insurance policy of the user 185 that insures the items in the home inventory.

The financial card issuer 170 may issue the financial card 189 and/or process transactions associated with the financial card 189. The financial card issuer 170 may be an entity that provides services pertaining to aspects and behaviors of financial cards. It is contemplated that the institution system 105 may handle such aspects and/or behaviors of financial cards using a financial card processor 130 for example, and that the financial card issuer 170 may not be used.

The financial card 189 may be a credit card or a prepaid credit card, for example. A credit card is a system of payment in which money is not removed from the user's account after every transaction. The financial card issuer 170, which may be an entity associated with the institution system 105 or a third party, lends money to the user 185 to be paid to the merchant 175. A prepaid credit card (referred to herein as a "prepaid card") is not really a credit card, as no credit is offered by the financial card issuer 170. The user 185 spends money which has been "stored" via a prior deposit by the user 185 or someone else, such as a parent or employer. However, it carries a credit card brand (e.g., Visa or MasterCard) and can be used in similar ways. After obtaining a prepaid card, the user 185 loads it with any amount of money and then uses the prepaid card to spend the money. In addition to a credit card or a prepaid card, the financial card 189 may be any type of payment device such as a debit card, a stored value card, a department store credit card, a mobile device, an RFID (radio-frequency identification) device, or a near-field communications device, for example.

The user 185 may use the financial card 189 to make a purchase at the merchant 175. As described further herein, the institution system 105 may receive and analyze transaction data associated with the purchase. The institution system 105 may send a notice to the user 185, e.g. via email, instant messaging, telephone, facsimile, mail, SMS (short message service), MMS (multimedia messaging service), a proprietary application residing on the user computing device 187, etc., asking if the user 185 would like to add the item(s) to a home inventory and/or obtain insurance coverage for the item(s) pertaining to the purchase. The notice may request the user send a photo of the item(s) or documentation pertaining to the item(s) to the institution system 105. The notice may be sent to a computing device associated with the user 185, such as the user computing device 187.

As described further herein, information may be received at the institution system 105 regarding one or more items purchased (or otherwise acquired) by the user 185, and the item(s) may be added to an electronic home inventory (e.g., maintained in storage by the institution system 105) and the item(s) may be added to an insurance policy (e.g., a homeowner's insurance policy or rider to the policy issued by the institution system 105). In an implementation, the institution system 105 may receive information about the item(s) from the merchant 175 who sold the item(s), an appraiser, the user 185 (e.g., who provides information by a website, by providing a receipt, etc.), from a barcode that is provided on the receipt associated with the purchase from the merchant 175, by a barcode generated by the user 185 (e.g., using data from the receipt and other information from the user 185), and/or via data (e.g., level 3 credit card data, etc.) from a financial card 189 transaction directed to the purchase of the item(s). The user 185 may be provided with a listing of the items that they have purchased or acquired using the data provided to the institution system 105, and can select which items are to be included in the home inventory and which items are to be added to an insurance policy.

The institution system 105 may include a user interface module 120, an insurance engine 121, an inventory engine 126, and a data source access engine 137. The user interface module 120 may generate and format one or more pages of content 119 as a unified graphical presentation that may be provided to the user computing device 187 as an output from the insurance engine 121 and/or the inventory engine 126. In an implementation, the page(s) of content 119 may be provided to the user computing device 187 via a secure website 118 associated with the institution system 105.

In an implementation, instead of hosting the website 118, the institution system 105 may comprise a conventional application server hosting a proprietary online service accessible only by a private network. In any event, the institution system 105 may have appropriate security mechanisms in place to prevent unauthorized third parties from intercepting the user's information.

The user 185 may be an individual who owns an insurance product (also may be referred to herein as a policy) or other account that may be provided by or held by the institution associated with the institution system 105. The user 185 may provide data to the institution system 105 via the user computing device 187. The user computing device 187 may be a handheld computing device such as a personal digital assistant (PDA) or a mobile phone, for example, or any type of personal computer (PC). The user computing device 187 and the institution system 105 may be connected over a network.

The user 185 may communicate with the institution system 105 by way of a communications network such as an intranet, the Internet, a local area network (LAN), a wide area network (WAN), a wireless fidelity (WiFi) network, a public switched telephone network (PSTN), a cellular network, a voice over Internet protocol (VoIP) network, and the like. An example user computing device is described with respect to FIG. 6. The user 185 may also communicate with the institution system 105 by phone, email, instant message, text message, web chat, facsimile, mail, and the like.

The merchant 175 may be any entity that may sell an item to the user 185. The user 185, as well as the institution system 105 and the financial card issuer 170, may be in communication with the merchant 175 via a communications network. During the authorization of a transaction, the merchant 175 may send data associated with the purchase, such as amount, merchant name, merchant category code (MCC), and financial card number, for example, to the financial card issuer 170 in an authorization message for verification and processing. An MCC is a number assigned to a business and is used to classify the business by the type of goods or services it provides. In an implementation, the authorization message may comprise additional data such as an itemized listing of the purchased items.

The institution system 105 may have the ability to interact with information that may be maintained and/or provided by the merchant 175, e.g., information pertaining to purchases made by the user 185. Additionally, the financial card issuer 170 and the user 185 may be in communication with the institution system 105 via a communications network.

In an implementation, the user 185 may have a barcode processor 188 which may comprise any type of device that can read a barcode on a receipt or an item, generate a barcode for a receipt or an item, and/or transmit a barcode to the user computing device 187 or the institution system 105. The barcode may contain information about items purchased or otherwise acquired by the user 185, as described further herein.

In an implementation, the user 185 may provide photo(s) or documentation to the institution system 105 about the item(s) purchased that they would like to add to a home inventory and/or insure. The user 185 may use an image generator, comprising a scanner for example, to generate a digital image of the item(s), receipt, proof of purchase, or other documentation. It is contemplated that any device that is capable of generating a digital image may be used to make the digital image(s). Additional devices that may be used in the generation of a digital image include a digital camera, a photocopier, a fax machine, and the like, for example.

The user 185 may transmit the digital image to the institution system 105 via the user computing device 187. The institution system 105 may use the digital image to generate or update a home inventory of the user 185 and/or generate or revise a premium quote for insuring the item(s) purchased by the user 185 or finalize insurance for the item(s). If a digital image is received, the insurance engine 121 may use any known image processing software or other application(s) to obtain the data from the digital image. The data may be used in the generation and/or updating of a home inventory and a premium quote. Alternatively, the user 185 may provide the photo, receipt, proof of purchase, or other documentation about the item(s) to the institution system 105 by any other electronic or physical techniques.

As described further herein, the insurance engine 121 may receive the transaction data pertaining to the purchase (or data relating to items that have been acquired by the user 185), which may include a receipt, a proof of purchase, and/or other documentation, and generate a premium quote using a premium generator 124. The premium generator 124 may use any techniques(s) for generating a premium quote for insuring the item(s). The premium generator 124 may use data retrieved from data source(s) 139 by a data source access engine 137. Additionally, the premium generator 124 may request and receive information pertaining to the item(s) from the user 185 and/or the merchant 175. This information may be used in generation of the premium quote. After retrieving or otherwise receiving the data from the various sources, the premium generator 124 may use tools, applications, and aggregators, for example, to generate a premium quote for insurance of the item(s). The premium quote may be provided to the user 185, who may accept the premium quote.

The insurance engine 121 may comprise an insurance processor 122 that may receive and analyze transaction data as described herein. The insurance processor 122 may also send a request to the user 185 requesting instructions regarding insuring items the user may have purchased with the financial card 189 or otherwise acquired. The insurance processor 122 may receive instructions from the user 185 and act on the instructions accordingly.

The inventory engine 126 may receive the transaction data pertaining to the purchase (or data relating to items that have been acquired by the user 185), request instructions from the user 185 as to whether the items are to be added to a home inventory, and/or generate a home inventory or update an existing home inventory comprising a listing of the items purchased and/or indicated by the user 185 to be included in the home inventory.

As described further herein, the inventory engine 126 may comprise an inventory generator 129 that may generate and maintain a home inventory (e.g., an inventory list of the items), as described further herein. The home inventory may comprise items purchased by the user 185 with the financial card 189, as well as items that the user may add to the inventory list, e.g., via the website 118. The inventory generator 129 may use data retrieved from data source(s) 139 by a data source access engine 137. Additionally, the inventory generator 129 may request and receive information pertaining to the item(s) from the user 185 and/or the merchant 175. This information may be used in generation or updating of the home inventory. After retrieving or otherwise receiving the data from the various sources, the inventory generator 129 may use tools, applications, and aggregators, for example, to generate a home inventory of the item(s). The home inventory may be provided to the user 185, who may review and revise the home inventory in an implementation.

The inventory engine 126 may comprise an inventory processor 127 that may receive and analyze transaction data as described herein. The inventory processor 127 may also send a request to the user 185 requesting instructions regarding adding items the user 185 may have purchased with the financial card 189 or otherwise acquired by the user 185 to the home inventory. The inventory processor 122 may receive instructions from the user 185 and act on the instructions accordingly. The inventory processor 127 may store the home inventory in storage 108 or the data source(s) 139.

Because the home inventory is maintained by the institution system 105 and is electronically accessible by the user 185, the home inventory is secure, readily available, and can be updated by the user 185 and/or the institution system 105. The home inventory provides legible, comprehensive item listings for insurance claim settlements in the event of a loss of the items. For example, the home inventory could be made accessible immediately to a claims adjuster in the event of a loss. The home inventory would be current, legible, and immediately available to begin the settlement process. The home inventory may be continuously updated and maintained to provide the most current information about items of the user 185.

The insurance engine 121 and the inventory engine 126 have access to data, files, and documents pertaining to the user 185 as well as any other data, files, and documents that are currently stored by the institution system 105 as well as external data, files, and documents and that may be useful in generating premium quotes, writing insurance policies, and generating and maintaining inventory lists such as home inventories.

The institution system 105 has the ability to retrieve information from one or more data sources 139 via a data source access engine 137. Data pertaining to the user 185, the user's home inventory, the user's insurance policies, and/or the user account(s) may be retrieved from data source(s) 139 and/or external data sources. The retrieved data may be stored centrally, perhaps in storage 108. Other information may be provided to the institution system 105 from the user 185 and/or the merchant 175.

Data source(s) 139 may contain data, metadata, email, files, and/or documents that the institution system 105 maintains pertaining to the user 185, such as personal data such as name, physical address, email address, etc., home inventory data such as listings of items and data associated with item (e.g., item purchase price, item acquisition date, merchant or other entity item acquired from, where the item is placed in the user's house, etc.), insurance policy data such as items covered, premiums, and coverage amounts and limits, as well as other account information. The institution system 105 may access this information when generating premium quotes, writing insurance policies, or maintaining inventory lists, for example.

A user access system may be communicatively coupled to the insurance engine 121 and the inventory engine 126 and may be configured to send machine-readable instructions to the insurance engine 121 and the inventory engine 126. As mentioned above, the institution system 105 may provide a unified graphical presentation output. The unified graphical presentation may be transmitted to the user access system. In an implementation, the unified graphical presentation may be combined with other materials and transmitted to the user 185. In an implementation, the unified graphical presentation is received by the user access system and transmitted directly to the user 185 without the inclusion of any other materials.

The user access system may be implemented as a web server in an implementation. The user access system, through the use of any suitable interactive web technology, provides an interactive experience to the user 185 through which access to insurance and inventory data and status and related data can be accomplished. The user 185 may enter information into the web pages via a web browser on the user computing device 187. Any technology that provides interactivity through a web browser is considered to be within the scope of the present discussion and may include, without limitation, Hyper-Text Mark-Up Language (HTML), Dynamic HTML (DHTML), JavaScript, and Ajax.

The institution system 105 may include any combination of systems and subsystems such as electronic devices including, but not limited to, computers, servers, databases, or the like. The electronic devices may include any combination of hardware components such as processors, databases, storage drives, registers, cache, random access memory (RAM) chips, data buses, or the like and/or software components such as operating systems, database management applications, or the like.

The institution system 105 may comprise one or more computing devices 106. The computing device(s) 106 may have one or more processors 107, storage 108 (e.g., storage devices, memory, etc.), and software modules 109. The computing device(s) 106, including its processor(s) 107, storage 108, and software modules 109, may be used in the performance of the techniques and operations described herein.

Examples of software modules 109 may include modules that may be used in conjunction with generating a premium quote and sending the premium quote to the user 185, issuing an insurance policy, maintaining a home inventory (e.g., an inventory list), generating web page content for display, and receiving instructions from the user 185, for example. While specific functionality is described herein as occurring with respect to specific modules, the functionality may likewise be performed by more, fewer, or other modules. An example computing device and its components are described in more detail with respect to FIG. 6.

Figure 2:
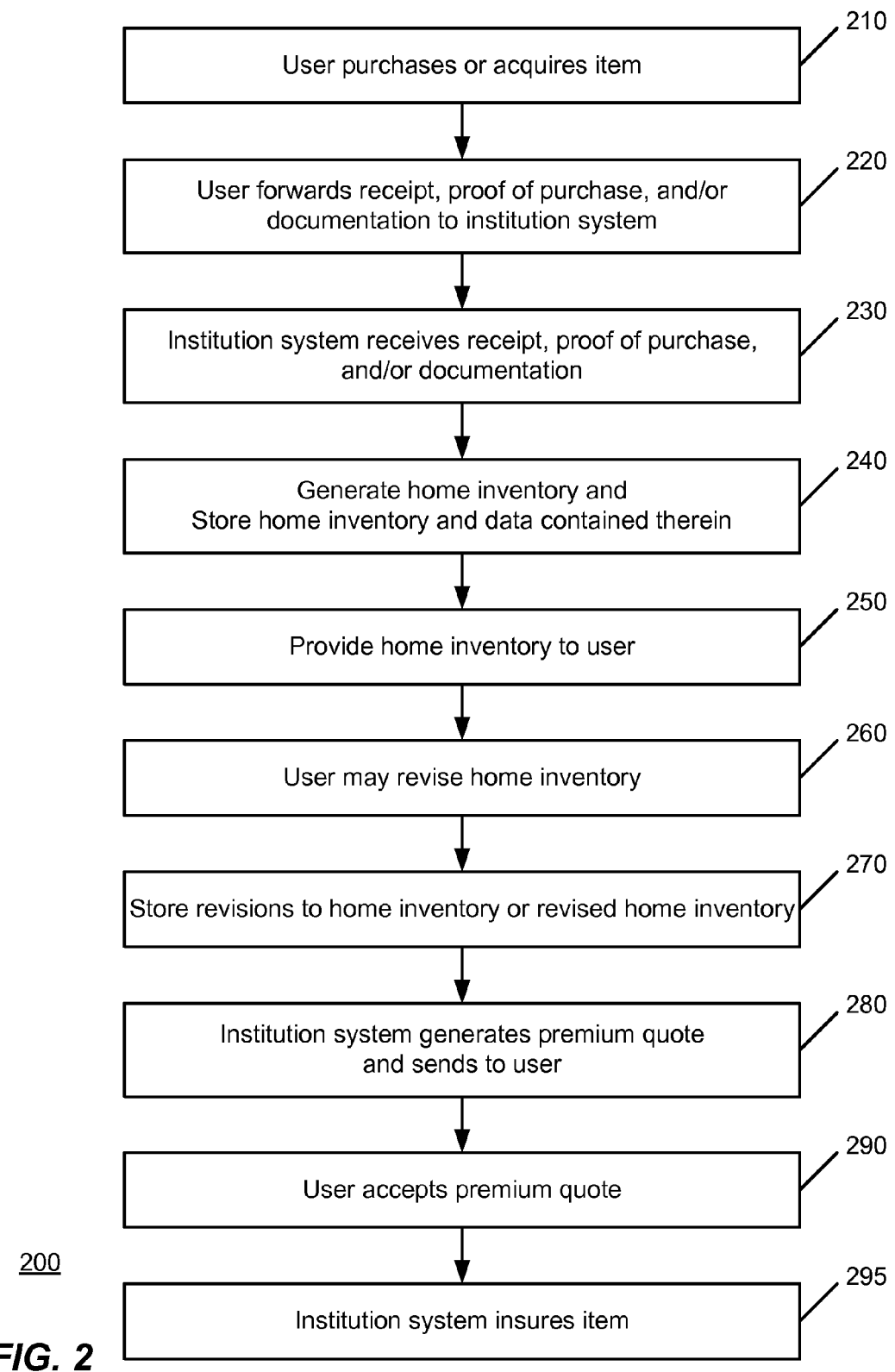
FIG. 2 is an operational flow of an implementation of a method that may be used to provide home inventory and insurance.

FIG. 2 is an operational flow of an implementation of a method 200 that may be used to provide home inventory and insurance. At 210, a user 185 may purchase or otherwise acquire an item, e.g. from a merchant 175, as a gift, etc. At 220, the user 185 may forward a receipt, proof of purchase, and/or other documentation pertaining to the purchase and/or acquisition of the item to the institution system 105, via email, a website, mail, facsimile, instant message, text message, web chat, etc.

In an implementation, the institution system 105 may obtain item data for the purchase, e.g., by contacting the merchant 175 associated with the purchase and/or by contacting the user 185. In an implementation, the institution system 105 may request from the user 185 and/or the merchant 175 a list of the particular items that were purchased and their associated purchase prices and other information such as purchase date and a description of the item. Alternatively or additionally, the institution system 105 may ask the user 185 for a copy (e.g., via facsimile or digital image sent by email or via a website) of the receipt associated with the purchase, and may use the receipt to identify the particular items that were purchased and their associated purchase prices and other information.

Thus, the institution system 105 may receive information about the item(s) from the merchant 175 who sold the item(s), an appraiser, the user 185, from a barcode provided on a receipt provided by the merchant 175, by a user generated barcode (e.g., using data from the receipt and other information from the user 185), and/or via financial card data (e.g., level 3 credit card data) from a financial card transaction directed to the purchase of the item(s).

In one example, the user 185 may provide a receipt to a barcode processor 188, which parses the individual items on the receipt and presents a user interface to the user 185 so the user 185 can select which items are to be added to a home inventory and/or an insurance policy. Data pertaining to the selected items may be communicated to the institution system 105, and may be added to a home inventory and/or insurance policy as requested by the user 185.

At 230, the institution system 105 may receive the receipt, proof of purchase, and/or other documentation. Using the receipt, proof of purchase, and/or other documentation, the institution system 105 may identify the items and may generate a home inventory of the items of the user 185 (e.g., an electronic home contents inventory) at 240, and may store the home inventory and the data contained therein in storage associated with the institution system 105.

In an implementation, the home inventory may be provided to the user 185 or may be accessible to the user at 250, e.g. via a website 118 associated with the institution system 105. The home inventory may be provided to the user 185 listed by subject matter (e.g., jewelry, electronics, etc.), by room in the house (e.g., living room, dining room, etc.), or by any other characteristic(s) or user-selectable criteria.

At 260, the user 185 may revise the home inventory, e.g., by making additions, deletions, or other changes, and may add notes to the home inventory, such as notes pertaining to the items on the list of items in the home inventory. The user 185 may also indicate the location (e.g., the room of the house) of one or more items. The institution system 105 may store the revisions and/or the revised home inventory at 270.

In an implementation, the user 185 may be provided with a list of their items using the data provided to the institution system 105 and can choose which items are to be included in the home inventory and which items are to be added to an insurance policy.

Based on a variety of factors pertaining to the item and/or the user, at 280, the institution system 105 may generate a premium quote to insure one or more items on the home inventory (e.g., by adding the item(s) to a rider to an existing homeowner's or renter's insurance policy or by issuing a new or revised insurance policy to cover the item(s)) and send the premium quote to the user 185 via any electronic or physical delivery technique(s). For generation of the premium quote, the institution system 105 may request and receive additional information pertaining to the user 185 and/or the item(s) from the user 185, the merchant 175, an appraiser, and/or the manufacturer of the item(s), for example. The premium quote may be for monetary reimbursement, replacement, or repair of the item(s) in the event of a loss. The user 185 may accept the premium quote at 290, and the institution system 105 may insure the item(s) at 295.

In an implementation, the user 185 may choose to opt out so that information about the item(s) purchased will not be provided to the user 185 for a home inventory and/or insurance because the purchase may be a gift for someone or the user 185 may not want another person to learn about the purchase. In an implementation, the user 185 may choose a notification mode (e.g., by email, by phone, by mail, etc.) and notification time and may choose the items they are to be notified about (or not notified about) with respect to a home inventory and/or insurance.

Figure 3:
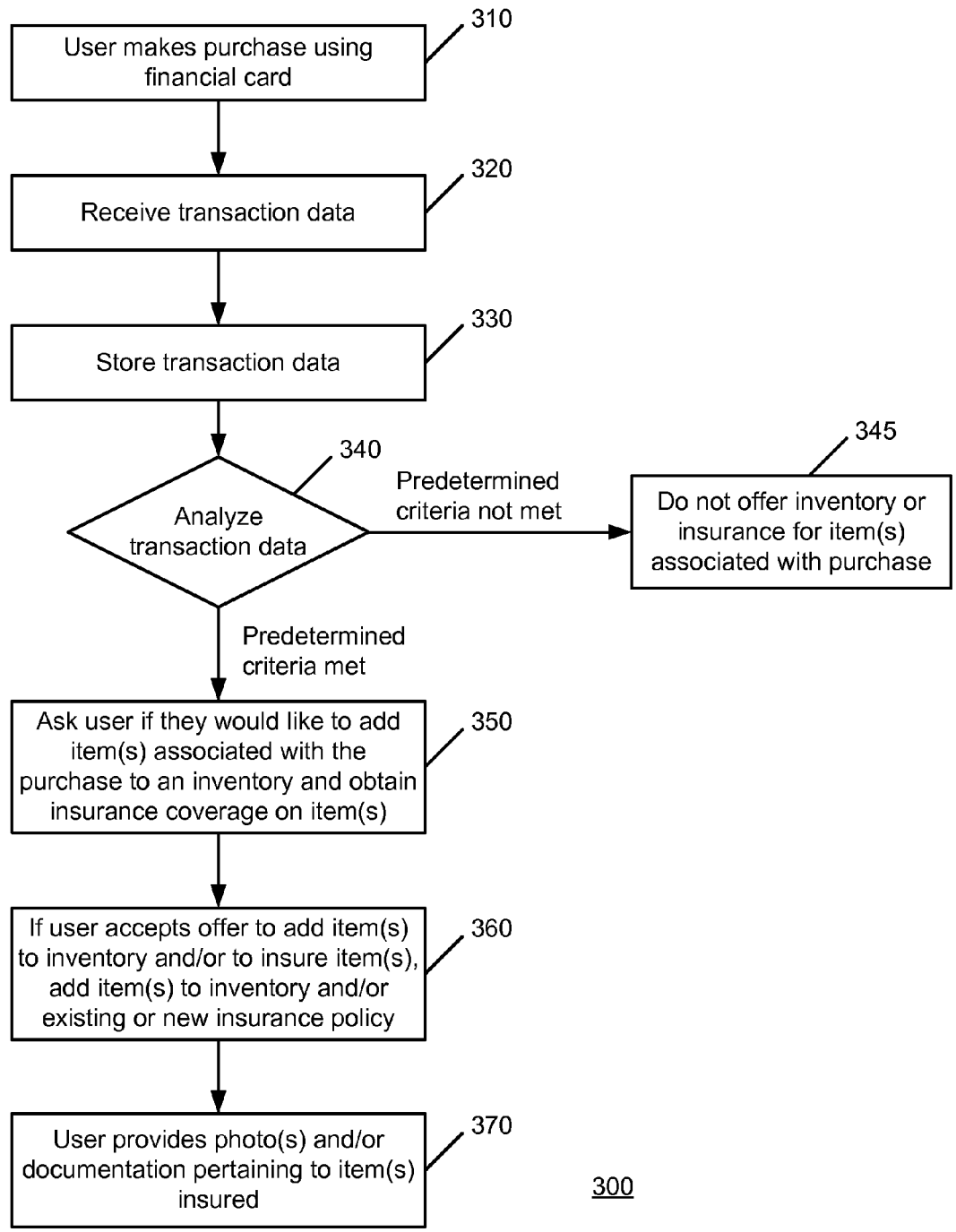
FIG. 3 is an operational flow of another implementation of a method that may be used to provide home inventory and insurance.

FIG. 3 is an operational flow of another implementation of a method 300 that may be used to provide home inventory and insurance. At 310, a user 185 makes a purchase using their financial card 189. In an implementation, over a period of time, such as one day, one week, one month, etc., the user 185 may make one or more purchases using their financial card 189. The institution system 105 may receive transaction data at 320 and may store the transaction data at 330. The institution system 105 may receive and store transaction data for each of the purchases. The transaction data may comprise an amount of the purchase and an MCC, for example.

In an implementation, the institution system 105 may have access to the transaction data because of a relationship the institution system 105 has with the financial card issuer 170. Alternatively or additionally, the institution system 105 may scrape the transaction data from a website associated with the financial card 189, provided the institution system 105 has the appropriate credentials and/or authorization, e.g., provided by the user 185, the financial card issuer 170, etc.

From time to time, such as periodically (e.g., the first day of each month, the closing date of the financial card billing cycle, etc.), the institution system 105 may analyze the transaction data associated with the purchases during the period of time against one or more predetermined criteria, and generate a list of the purchases made with the financial card 189 that meet the predetermined criteria. The list may be provided to the user 185. A request may be provided to the user 185 to indicate if they would like to add the item(s) associated with any of the purchases to a home inventory and if they would like to obtain insurance coverage on the item(s) associated with any of the purchases on the list. The user 185 may indicate which, if any, of the purchases on the list have one or more associated items that they would like to insure. The user 185 may provide the indication to the institution system 105 electronically or physically.

At 340, the institution system 105 may analyze the transaction data associated with the purchase against one or more predetermined criteria. If the predetermined criteria are met, then the institution system 105 may contact the user 185 at 350 and ask the user 185 if they would like to add the items to an inventory and/or if they would like insurance coverage on the item(s) associated with the purchase e.g., by adding the item(s) to an existing insurance policy or purchasing a new insurance policy for the item(s). The institution system 105 may contact the user 185 via a website, facsimile, phone, email, instant message, text message, web chat, and the like. The user 185 may accept or decline the offer to add the items to an inventory and/or insure the item(s). Upon the user 185 accepting, the institution system 105 may add the item(s) to an inventory and/or existing insurance policy of the user 185 or a new insurance policy at 360.

At some point, in an implementation, at 370, the user 185 may provide one or more photos of the item(s) and/or documentation pertaining to the item(s) to the institution system 105 to provide further evidence or information about the item(s) to the institution system 105. The user 185 may use a digital camera, a phone, or any type of device or an image generator to generate a photo or digital image of the item(s) and/or the documentation. The user 185 may provide the photo(s) and/or documentation by any electronic or physical techniques, such as email, via a website, mail, or facsimile. The photo(s) and/or documentation may be stored by the institution system 105 and may be used in the home inventory and/or generation or revision of a premium quote. The institution system 105 may store the photo(s) and/or documentation in a database record associated with the user 185, an insurance policy of the user 185, or a home inventory of the user 185, for example.

If the predetermined criteria are not met at 340, an offer to add the item(s) to the inventory and/or to insure the item(s) associated with the purchase may not be generated or made to the user 185 and processing may end at 345.

In an implementation, the institution system 105 may generate a premium quote to insure the item(s) and may provide the premium quote to the user 185 when asking the user 185 if they would like insurance coverage on the item(s) or if they would like to add the item(s) to a home inventory. Alternatively, the institution system 105 may provide a premium quote to the user 185 after the user 185 accepts an offer to insure the item(s) or add the item(s) to a home inventory.

Regarding the predetermined criteria, in an implementation, the amount of the purchase may be compared to a threshold purchase amount (e.g., $500, $1000, etc.), and if the threshold purchase amount is exceeded, then the institution system 105 may contact the user 185 about adding the item(s) of the purchase to a home inventory and/or insuring the item (s) associated with the purchase.

In an implementation, the user 185 may be contacted about adding the item(s) to a home inventory and/or insuring the item(s) only if the MCC corresponds to one or more particular categories of goods and/or services. For example, if the MCC for a transaction corresponds to jewelry or retail electronics, then the user 185 may be contacted about adding the item(s) to an inventory and insuring the item(s) associated with the purchase; otherwise, the user 185 may not be contacted.

In an implementation, an MCC may have a particular threshold purchase amount associated with it. If the threshold purchase amount for the MCC is exceeded by a purchase, then the user 185 may be contacted about insuring the item(s) and adding the item(s) to a home inventory. Different MCCs may have different threshold purchase amounts. For example, the MCC for retail electronics may have a threshold purchase amount of $500 and the MCC for jewelry may have a threshold purchase amount of $2000. Alternatively or additionally, the user 185 may be contacted about insuring the item(s) and adding the item(s) to a home inventory if a threshold purchase amount is exceeded, regardless of the MCC. For example, if the amount of the purchase is greater than $5000, then the user 185 may be contacted about insuring the item(s) and adding the item(s) to a home inventory regardless of the MCC that is associated with the transaction.

Figure 4:
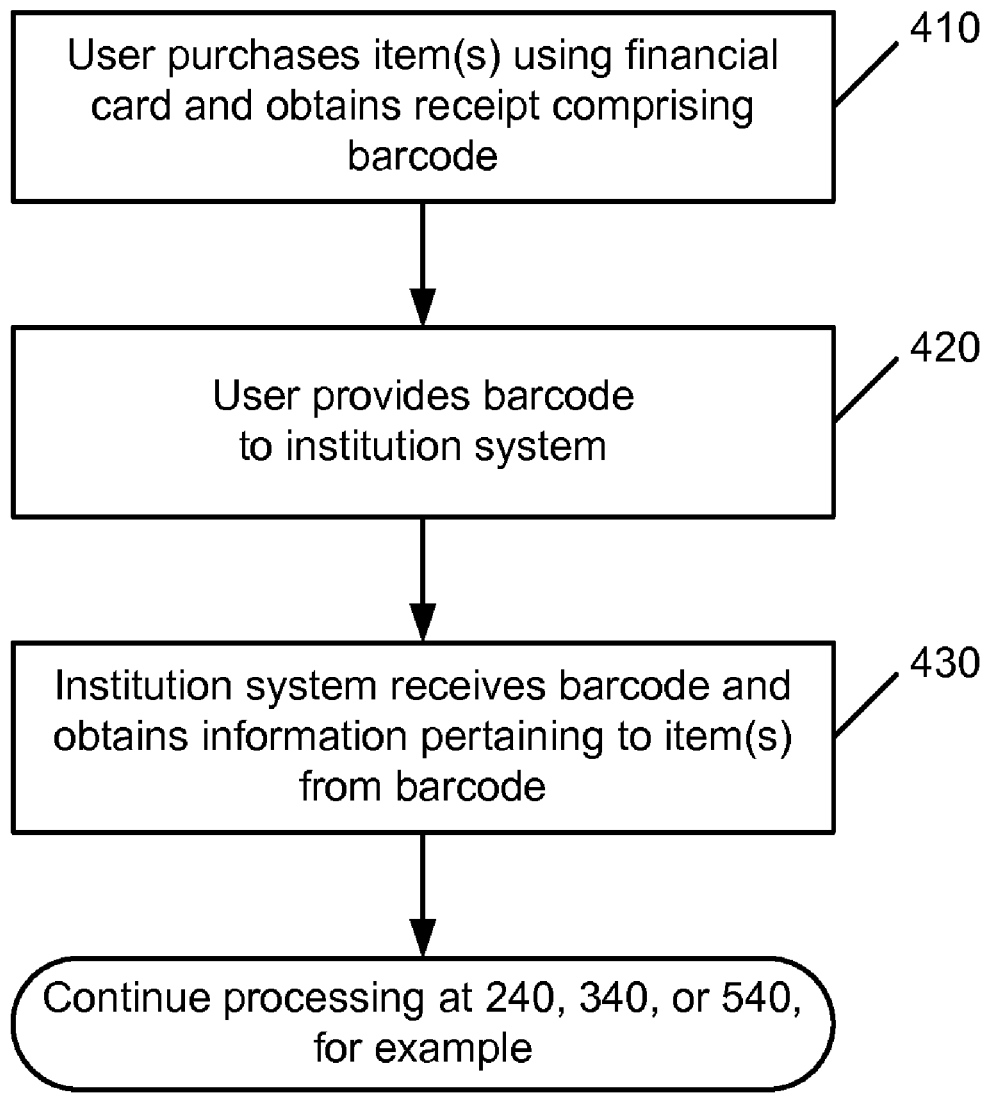
FIG. 4 is an operational flow of another implementation of a method that may be used to provide home inventory and insurance.

FIG. 4 is an operational flow of another implementation of a method 400 that may be used to provide home inventory and insurance. At 410, a user 185 may purchase an item and obtain a receipt for the item. The receipt may comprise a barcode containing information directed to the purchase. The barcode may comprise information such as merchant, date, amount, items purchased (electronics, jewelry, food, clothing, etc.), and the like.

At 420, the user 185 may provide the barcode to institution system 105 (e.g., by emailing, faxing, or otherwise electronically sending a copy of the barcode or receipt to the institution system 105, by mailing a copy of the barcode or receipt to the institution system 105, etc.). At 430, the institution system 105 may receive the barcode and obtain information from the barcode pertaining to the item purchased. Any known barcode reader or analyzer may be used by the institution system 105. The institution system 105 may request and receive additional information from other sources, such as the user 185, the merchant 175, the financial card issuer 170, and one or more data source(s) that are internal or external to the institution system 105. Processing may continue at 240, 340, or 540 (described with respect to the method 500 in FIG. 5), for example, depending on the implementation.

Figure 5:
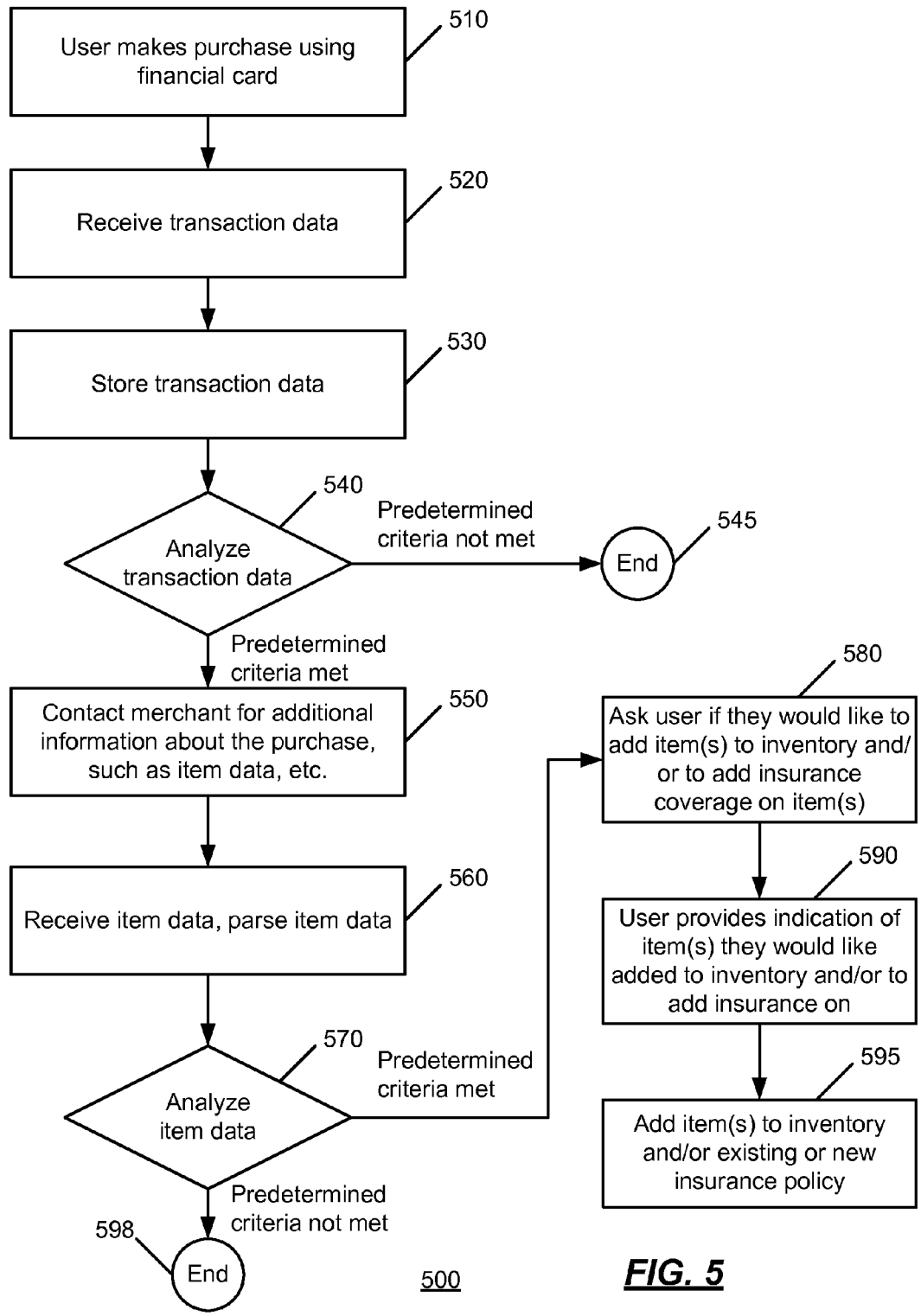
FIG. 5 is an operational flow of another implementation of a method that may be used to provide home inventory and insurance.

FIG. 5 is an operational flow of another implementation of a method 500 that may be used to provide home inventory and insurance. The institution system 105 may obtain data from the merchant 175 corresponding to the purchase, such as the particular items purchased and the purchase price of each item in the purchase. At 510, a user 185 makes a purchase using their financial card 189. The institution system 105 may receive transaction data at 520 from the merchant 175 and may store the transaction data at 530. In an implementation, the merchant 175 may provide the transaction data directly to the institution system 105. Alternatively or additionally, the merchant 175 may provide the transaction data to the user 185 (e.g., to the user's handheld computing device or mobile phone), and the user 185 may forward the transaction data to the institution system 105 (e.g., via email, a website 118, instant message, text message, web chat, and the like).

At 540, the institution system 105 may analyze the transaction data associated with the purchase against one or more predetermined criteria, such as purchase amount and/or MCC. If the predetermined criteria are not met, processing may end at 545. If the predetermined criteria are met, at 550 the institution system 105 may contact the merchant 175 for additional information about the purchase, such as item data comprising the particular items purchased and their associated purchase prices.

At 560, the institution system 105 may receive the item data and parse the item data for individual items in the purchase. At 570, the institution system 105 may analyze the item data against one or more predetermined criteria, such as cost and/or product type (e.g., jewelry, cameras, furs, coins, stamps, etc.), e.g. to determine which of the items may be added to a home inventory and/or may be protectable under an insurance policy that may be issued by the institution system 105 to the user 185 (e.g., a homeowner's policy of the user 185).

At 580, if the predetermined criteria are met, the institution system 105 may contact the user 185 and ask the user 185 if they would like to add the items to a home inventory and/or to add insurance coverage on the item(s) e.g., by adding the item(s) to an existing insurance policy or purchasing a new insurance policy for the item(s). The institution system 105 may provide a premium quote for each of the items. The user 185 may want insurance on one or more of the items and/or add the item(s) to a home inventory, and may provide an indication or selection(s) to the institution system 105 at 590. The institution system 105 may add the item(s) to a home inventory of the user 185 (e.g., based on an identifier of the user 185) and/or an existing insurance policy of the user or a new insurance policy at 595.

If the predetermined criteria are not met at 570, an offer to add the item(s) to a home inventory or insure the item(s) associated with the purchase may not be generated or made to the user 185 and processing may end at 598.

Figure 6:
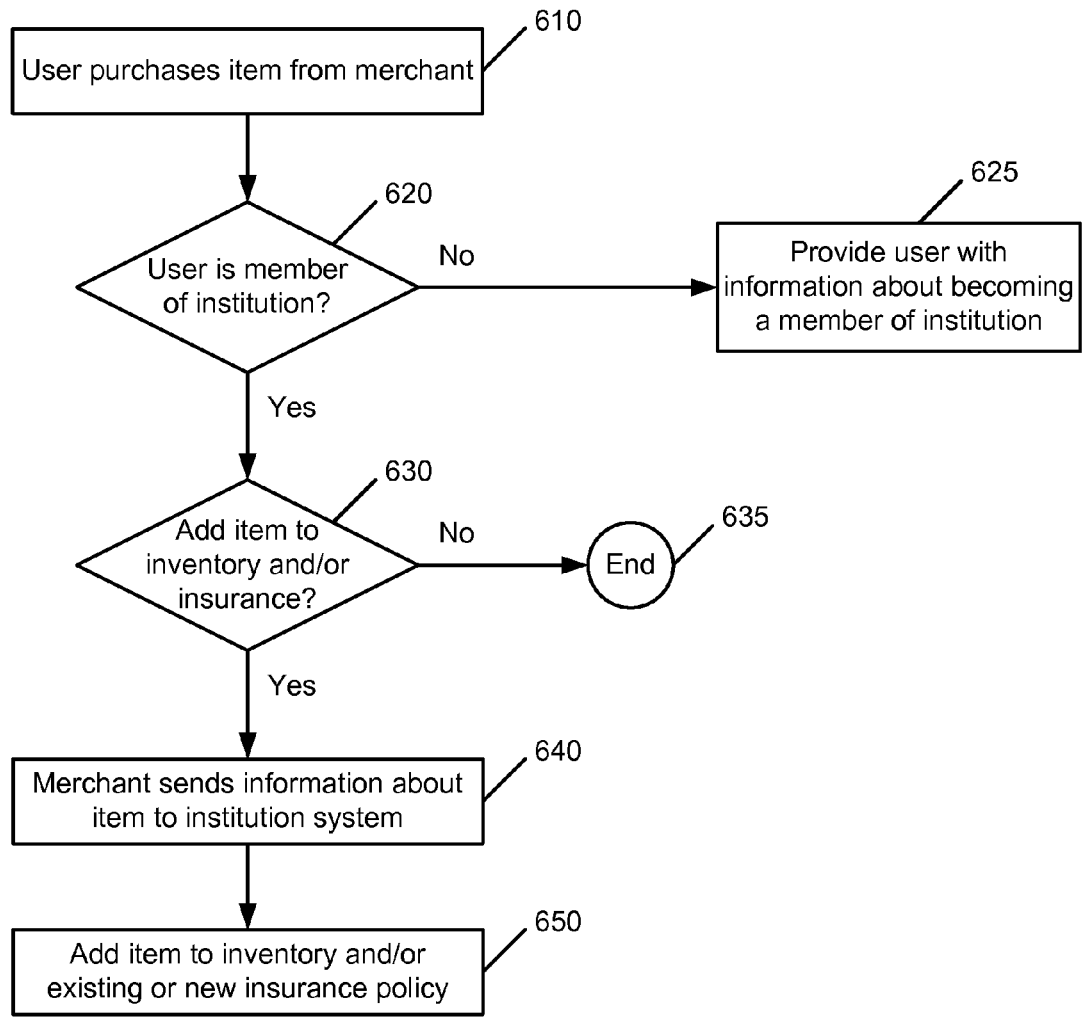
FIG. 6 is an operational flow of another implementation of a method that may be used to provide home inventory and insurance.

FIG. 6 is an operational flow of another implementation of a method 600 that may be used to provide home inventory and insurance. At 610, a user 185 may purchase an item from a merchant 175. At 620, the merchant 175 may determine if the user 185 is a member of, or otherwise associated with, an institution affiliated with the institution system 105 (e.g., has a home inventory and/or an insurance policy with the institution system 105). The merchant 175 may perform such a determination by requesting and receiving information from the user 185 or the institution system 105, for example, directed to whether or not the user 185 has a home inventory and/or an insurance policy with the institution system 105. Any data request and transmission technique(s) may be used.

If the user 185 does have a home inventory and/or an insurance policy with the institution system 105, at 630, the merchant 175 may ask the user 185 if the user 185 would like to add the item to the home inventory and/or the insurance policy. If so, at 640, the merchant 175 may send information about the item (e.g., description, purchase price, date, photograph, proof of purchase, etc.) to the institution system 105. The institution system 105 may receive the information about the item, and may add the item to the home inventory and/or an existing or new insurance policy, at 650. In an implementation, the institution system 105 generates a premium quote and provides it to the user 185.

In an implementation, if the user 185 is not a member of the institution as determined at 620, the user 185 may be provided with information and an opportunity to become a member at 625 and thus obtain the ability to establish a home inventory and an insurance policy for the item with the institution system 105. In an implementation, if the user 185 does not want to add the item to a home inventory or an insurance policy, processing may end at 635.

Figure 7:
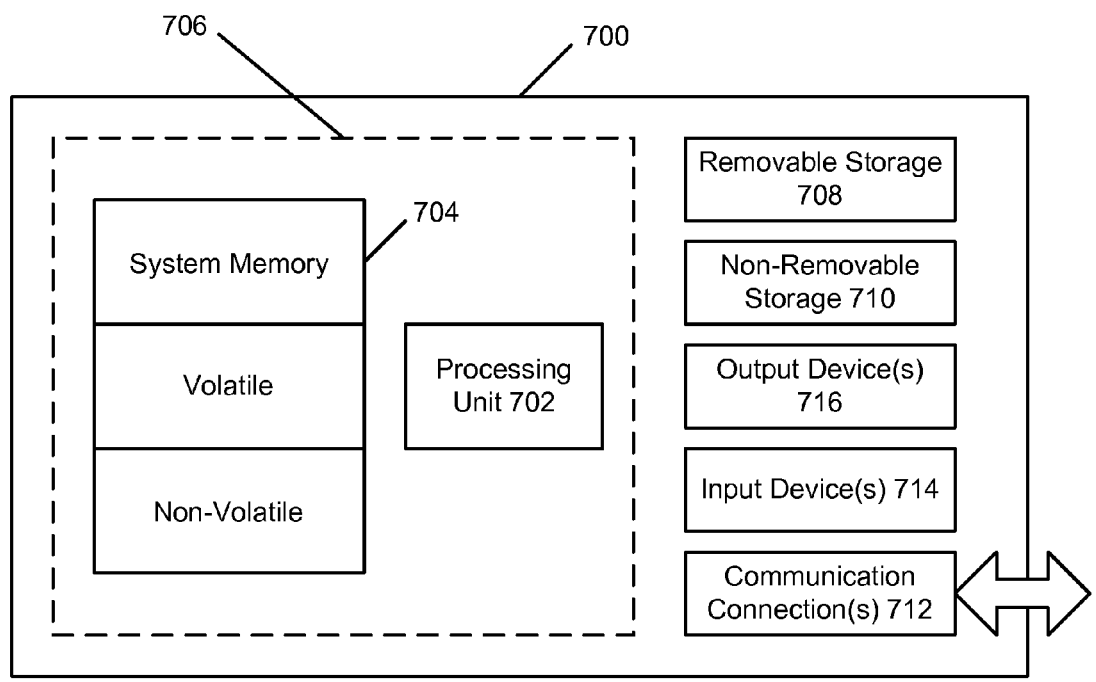
FIG. 7 is a block diagram of an example computing environment in which example embodiments and aspects may be implemented.

FIG. 7 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, an exemplary system for implementing aspects described herein includes a computing device, such as computing device 700. In its most basic configuration, computing device 700 typically includes at least one processing unit 702 and system memory 704. Depending on the exact configuration and type of computing device, system memory 704 may be volatile (such as RAM), non-volatile (such as read-only memory (ROM), flash memory, etc.), or some combination of the two. This most basic configuration is illustrated in FIG. 7 by dashed line 706.

Computing device 700 may have additional features and/or functionality. For example, computing device 700 may include additional storage (removable and/or non-removable) including, but not limited to, magnetic or optical disks or tape. Such additional storage is illustrated in FIG. 7 by removable storage 708 and non-removable storage 710.

Computing device 700 typically includes a variety of computer-readable media. Computer-readable media can be any available media that can be accessed by computing device 700 and include both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 704, removable storage 708, and non-removable storage 710 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of computing device 700.

Computing device 700 may also contain communication connection(s) 712 that allow the computing device 700 to communicate with other devices. Communication connection(s) 712 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 700 may also have input device(s) 714 such as a keyboard, mouse, pen, voice input device, touch input device, etc. Output device(s) 716 such as a display, speakers, printer, etc. may also be included. All these devices are well known in the art and need not be discussed at length here.

Computing device 700 may be one of a plurality of computing devices 700 inter-connected by a network. As may be appreciated, the network may be any appropriate network, each computing device 700 may be connected thereto by way of communication connection(s) 712 in any appropriate manner, and each computing device 700 may communicate with one or more of the other computing devices 700 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device.

One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A home inventory insurance system, comprising:
a network connection;
a memory; and
a processor programmed to execute a plurality of instructions, the instructions, when executed, cause the processor to perform the following method steps:
receiving via the network connection, at an institution system, from a financial institution, data pertaining to an item of a user for use by an insurance engine and an inventory engine of the institution system, the institution system maintaining a home inventory for the user and issuing an insurance policy for items in the home inventory for the user, wherein the data comprises transaction data associated with a purchase of the item made by the user using a financial card issued by the financial institution;
analyzing the transaction data with respect to at least one predetermined criterion using a computing device of the institution system;
determining, after the purchase of the item by the user, using the computing device of the institution system that the at least one predetermined criterion is met;
notifying the institution system to ask, based on the at least one predetermined criterion being met, the user whether the user would like to add the item to the home inventory;
receiving the user's acceptance in relation to adding the item to the home inventory;
adding the item to the home inventory using the data and the inventory engine;
notifying the institution system to ask, based on the at least one predetermined criterion being met, the user whether the user would like to add the item to the insurance policy;
receiving the user's acceptance in relation to adding the item to the insurance policy; and
insuring the item with the insurance policy using the data and the insurance engine.

2. The system of claim 1, wherein the data is also received from a merchant of the item.

3. The system of claim 1, wherein the data is also received from a receipt of a purchase of the item.

4. The system of claim 3, wherein the data is received from a barcode on the receipt.

5. The system of claim 1, wherein the data is also received from a computing device of the user.

6. The system of claim 1, wherein the data comprises transaction data associated with a purchase of the item using a credit card of the user.

7. The system of claim 1, wherein the processor is programmed to execute further instructions comprising instructions to associate the home inventory with the insurance policy in storage of the institution system.

8. A non-transitory computer-readable medium comprising computer-readable instructions for operating a home inventory insurance system, said computer-readable instructions comprising instructions that:

receive, at an institution system, from a financial institution, transaction data associated with a purchase made by a user using a financial card issued by the financial institution;

analyze the transaction data with respect to at least one predetermined criterion using a computing device of the institution system, the transaction data pertaining to the purchase made by the user, determine using the computing device of the institution system that the at least one predetermined criterion is met;

transmit, based on the at least one predetermined criterion being met, information to notify the institution system to ask the user whether the user would like to add at least one item associated with the purchase to a home inventory of the user maintained by the institution system;

receive using the computing device of the institution system an acceptance from the user in relation to adding the at least one item associated with the purchase to the home inventory;

add the at least one item to the home inventory;

transmit, based on the item being added to the home inventory, information to notify the institution system to ask the user whether the user would like to add the at least one item associated with the purchase to an insurance policy insuring the home inventory of the user and issued by the institution system;

receive using the computing device of the institution system an acceptance from the user in relation to adding the at least one item associated with the purchase to the insurance policy; and add the at least one item to the insurance policy.

9. The computer-readable medium of claim 8, wherein the at least one predetermined criterion comprises a threshold purchase amount.

10. The computer-readable medium of claim 8, wherein the at least one predetermined criterion comprises a merchant category code (MCC).

11. The computer-readable medium of claim 8, wherein further comprising instructions that receive documentation pertaining to the at least one item associated with the purchase.

12. The computer-readable medium of claim 11, wherein the documentation is provided by the user.

13. The computer-readable medium of claim 8, wherein the institution operating the home inventory and insurance system is related to the financial institution.

14. The computer-readable medium of claim 8, further comprising instructions that receive the transaction data from a merchant associated with the purchase made by the user.

15. A home inventory insurance system, comprising:
at least one subsystem that receives, at an institution system, from a financial institution, transaction data at a computing device of the institution system, the transaction data pertaining to a plurality of purchases made by a user over a predetermined period of time using a financial card issued by the financial institution;

at least one subsystem that determines, using the computing device of the institution system, that the transaction data meets at least one predetermined criterion;

at least one subsystem that provides a list of the purchases to a user computing device of the user;

at least one subsystem that receives at the computing device of the institution system from the user computing device an indication regarding adding at least one item associated with at least one of the purchases to a home inventory of the user and an insurance policy for the home inventory;

at least one subsystem that generates the home inventory comprising the at least one item using an inventory generator of the institution system;

at least one subsystem that stores the home inventory in storage of the institution system; and at least one subsystem that insures the at least one item with the insurance policy for the home inventory issued by the institution system.

16. The system of claim 15, wherein receiving the transaction data is performed periodically.

17. The system of claim 15, further comprising at least one subsystem that analyzes the transaction data with respect to at least one predetermined criterion, wherein the list of the purchases comprises only purchases associated with the transaction data that meet the at least one predetermined criterion.

18. The system of claim 17, wherein the at least one predetermined criterion is whether the purchases are for any items that are protectable under the insurance policy.

19. The system of claim 15, further comprising at least one subsystem that receives item data from the user regarding the at least one item, wherein generating the home inventory and insuring the at least one item use the item data.

20. The system of claim 15, further comprising at least one subsystem that receives item data from a merchant associated with the at least one item, wherein generating the home inventory and insuring the at least one item use the item data.

21. The system of claim 15, further comprising:
at least one subsystem that provides the home inventory to the user via the user computing device;
at least one subsystem that receives information regarding the home inventory from the user via the user computing device; and
at least one subsystem that stores the information in storage of the institution system associated with the home inventory.

* * * * *